US011929510B2

(12) United States Patent
Xu

(10) Patent No.: US 11,929,510 B2
(45) Date of Patent: Mar. 12, 2024

(54) SECONDARY BATTERY AND MANUFACTURING METHOD THEREOF, BATTERY MODULE, AND APPARATUS

(71) Applicant: Contemporary Amperex Technology Co., Limited, Ningde (CN)

(72) Inventor: Hu Xu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/717,179

(22) Filed: Apr. 11, 2022

(65) Prior Publication Data

US 2022/0238890 A1 Jul. 28, 2022

Related U.S. Application Data

(63) Continuation of application No. PCT/CN2020/089440, filed on May 9, 2020.

(51) Int. Cl.
*H01M 50/533* (2021.01)
*H01M 4/78* (2006.01)
*H01M 10/04* (2006.01)
*H01M 50/536* (2021.01)

(52) U.S. Cl.
CPC ........... *H01M 4/78* (2013.01); *H01M 10/049* (2013.01); *H01M 50/533* (2021.01); *H01M 50/536* (2021.01); *H01M 2220/20* (2013.01)

(58) Field of Classification Search
CPC .. H01M 50/50; H01M 50/533; H01M 50/536; H01M 4/78
See application file for complete search history.

(56) References Cited

U.S. PATENT DOCUMENTS

2017/0047576 A1 2/2017 Guen
2019/0221825 A1 7/2019 Lee et al.

FOREIGN PATENT DOCUMENTS

| CN | 103490039 A | 1/2014 |
| CN | 205385061 U | 7/2016 |
| CN | 108428847 A | 8/2018 |

(Continued)

OTHER PUBLICATIONS

The First Office Action for Chinese Application No. 20 20 800 05792.5, dated May 10, 2023, 11 pages.

(Continued)

*Primary Examiner* — Kenneth J Douyette
(74) *Attorney, Agent, or Firm* — East IP P.C.

(57) ABSTRACT

The present application relates to a secondary battery and manufacturing method thereof, a battery module and an apparatus. The secondary battery includes an electrode assembly including a main body portion and a tab extending out from the main body portion; a current collecting member including a guiding section, which extends in a direction perpendicular to a length direction of the electrode assembly; a transition connecting piece, being separately provided from the current collecting member and including a current collecting portion and a fixing portion, the current collecting portion being adapted to connect with the tab to form a first connection region, the fixing portion being adapted to connect with the guiding section to form a second connection region, and respective projections of the first connection region and the second connection region on a plane perpendicular to the length direction do not overlap.

20 Claims, 9 Drawing Sheets

(56) References Cited

FOREIGN PATENT DOCUMENTS

| | | |
|---|---|---|
| CN | 208507745 U | 2/2019 |
| CN | 209232866 U | 8/2019 |
| CN | 209658320 U | 11/2019 |
| CN | 209963180 U | 1/2020 |
| CN | 210015907 U | 2/2020 |
| CN | 210136949 U | 3/2020 |
| CN | 111048728 A | 4/2020 |
| EP | 3451417 A1 | 3/2019 |

OTHER PUBLICATIONS

The extended European search report for European Application No. 20935156.8, dated Jan. 25, 2023, 10 pages.
PCT International Search Report for PCT/CN2020/089440, dated Feb. 9, 2021, 10 pages.

SECONDARY BATTERY AND MANUFACTURING METHOD THEREOF, BATTERY MODULE, AND APPARATUS

CROSS REFERENCES TO RELATED APPLICATIONS

This application is a continuation of International Application No. PCT/CN2020/089440, filed on May 9, 2020, the contents of which are hereby incorporated by reference in their entireties.

TECHNICAL FIELD

The present disclosure relates to a technical field of batteries, and particularly relates to a secondary battery and manufacturing method thereof, a battery module and an apparatus.

BACKGROUND

Secondary batteries have advantages of high energy density, long service life, energy saving and environmental protection, etc., and are widely used in different fields such as alternative fuel vehicles and energy storage power stations.

In the prior art, a secondary battery includes an electrode assembly and a current collecting member. The electrode assembly includes a main body portion and tabs extending from the main body portion. In order to extract the electric energy of the electrode assembly to the outside of the secondary battery, the tabs and the current collecting member are usually connected, forming a connection region between them.

SUMMARY

However, during use of the secondary battery, the secondary battery is charged and discharged many times, and it is found that the connection region between the tab and the current collecting member has a poor current flowing capability, which affects the performance of the secondary battery.

The embodiment of the present application provides a secondary battery and manufacturing method thereof, a battery module and an apparatus, which can reduce the possibility of decrease of the current flowing capability of the tab.

On one aspect, the embodiment of the present application provides a secondary battery, including:

an electrode assembly including a main body portion and a tab extending out from the main body portion;

a current collecting member including a guiding section, the guiding section extending in a direction perpendicular to a length direction of the electrode assembly;

a transition connecting piece, the transition connecting piece and the current collecting member being separately provided, the transition connecting piece including a current collecting portion and a fixing portion, the current collecting portion being adapted to connect with the tab to form a first connection region, the fixing portion being adapted to connect with the guiding section to form a second connection region, and respective projections of the first connection region and the second connection region on a plane perpendicular to the length direction do not overlap.

On a further aspect, the embodiment of the present application provides a manufacturing method for a secondary battery, the method includes steps of:

providing an electrode assembly, the electrode assembly including a main body portion and a tab extending out from the main body portion;

providing a current collecting member, the current collecting member including a guiding section extending in a direction perpendicular to a length direction of the electrode assembly;

providing a transition connecting piece, the transition connecting piece including a current collecting portion and a fixing portion; and connecting the current collecting portion with the tab to form a first connection region and connecting the fixing portion with the guiding section to form a second connection region, wherein respective projections of the first connection region and the second connection region on a plane perpendicular to the length direction do not overlap.

On another further aspect, the embodiment of the present application provides a battery module, including the secondary battery according to the above-mentioned embodiments.

On another further aspect, the embodiment of the present application provides an apparatus using a secondary battery as a power source, wherein the apparatus includes the secondary battery according to the above-mentioned embodiments.

In the secondary battery according to the embodiment of the present application, the tab of the electrode assembly and the current collecting portion of the transition connecting piece are connected to form a first connection region, and the fixing portion of the transition connecting piece and the guiding section of the current collecting member are connected to form a second connection region; when achieving the connection of the tab with the guiding section, the first connection region and the second connection region will not overlap, thereby improving the current flowing capability of the tab.

BRIEF DESCRIPTION OF THE DRAWINGS

The features, advantages, and technical effects of the exemplary embodiments of the present application will be described below with reference to the accompanying drawings.

Figure 1:
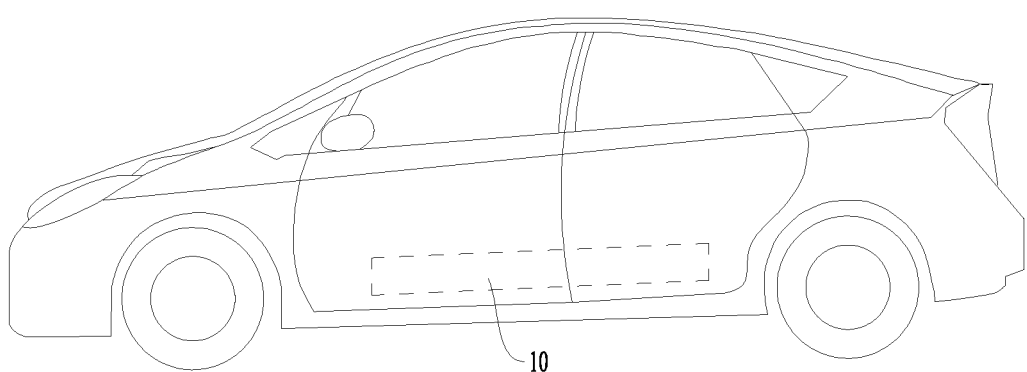
FIG. 1 is a schematic structural diagram of a vehicle disclosed in an embodiment of the present application.

In the drawings, the drawings are not drawn to actual scale.

REFERENCE NUMERALS 1, vehicle;
10, battery pack;
20, battery module;
30, secondary battery; 31, casing; 32, electrode assembly; 321, main body portion; 321a, end surface; 322, tab;
40, cap assembly; 41, cap plate; 42, electrode terminal; 43, current collecting member; 431, terminal connecting section; 432, guiding section; 432a, leg;
50, transition connecting piece; 51, current collecting portion; 51a, accommodating recess; 52, fixing portion;
60, first sheet; 70, second sheet; 80, third sheet; 90, busbar; 100, first connection region; 200, second connection region;
X, length direction; Y, thickness direction; Z, width direction.

DETAILED DESCRIPTION

The implementations of the present application are described below in further detail with reference to the accompanying drawings and embodiments. The following detailed description of the embodiments and the accompanying drawings are used to exemplarily illustrate the principle of the present application, but cannot be used to limit the scope of the present application, that is, the present application is not limited to the described embodiments.

In the description of the present application, it should be noted that, unless otherwise stated, "multiple" means two or more; the orientation or positional relationship indicated by the terms "upper", "lower", "left", "right", "inside", "outside" or the like is merely used for convenience of describing the application and simplifying the description, rather than indicating or implying that the device or element referred to must have a particular orientation, or be constructed and operated in a particular orientation, and therefore cannot be understood as a limitation to the present application. In addition, the terms "first", "second", "third", or the like are only used for descriptive purposes, and cannot be understood as indicating or implying relative importance. "Perpendicularity" does not mean a strict perpendicularity, but allows an error within an allowed range. "Parallel" does not mean a strict parallel but allows an error within an allowed range.

The orientation words appearing in the following description all refer to the directions shown in the drawings, and are not intended to define the specific structure of the present application. In the description of the present application, it should also be noted that, unless otherwise clearly defined and specified, the terms "install", "connect", and "couple" should be understood in a broad sense, for example, may refer to a fixed connection, a detachable connection, or an integral connection, may refer to a direct connection or an indirect connection through an intermediate medium. For the person skilled in the art, the specific meaning of the above-mentioned terms in the present application can be understood according to specific circumstances.

In order to better understand the present application, the embodiments of the present application are described below in combination with FIGS. 1-13.

The embodiment of the present application provides an apparatus that uses a secondary battery 30 as a power source. The apparatus may be but is not limited to, a vehicle, a ship, or an aircraft. Referring to FIG. 1, an embodiment of the present application provides a vehicle 1 including a vehicle body and a battery block. The battery block is provided on the vehicle body. The vehicle 1 may be a pure electric vehicle, a hybrid electric vehicle or an extended-range vehicle. The vehicle body is provided with a drive motor electrically connected to the battery block. The battery block provides power to the drive motor. The drive motor is connected to wheels on the vehicle body through a transmission mechanism to drive the vehicle to travel. Optionally, the battery block may be horizontally arranged at the bottom of the vehicle body.

Figure 2:
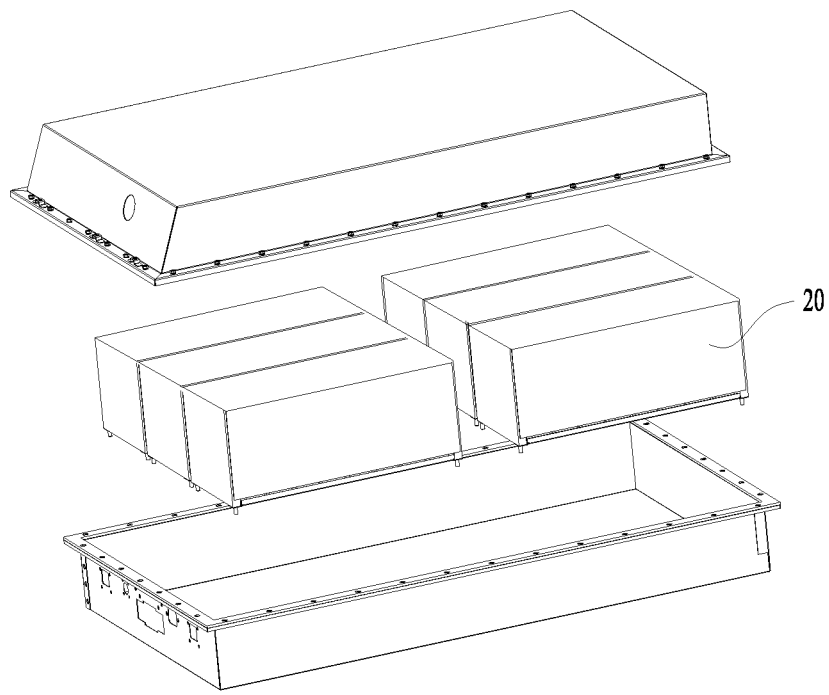
FIG. 2 is an explosive schematic diagram of a structure of a battery pack disclosed in an embodiment of the present application.

As shown in FIG. 2, the battery block may be formed as a battery pack 10. The battery pack 10 may be provided in various manners. In some optional embodiments, the battery pack 10 includes a housing and a battery module 20 disposed in the housing. There may be one or more battery modules 20. The one or more battery modules 20 are arranged in a row in the housing. The type of the housing is not limited. The housing may be a frame-shaped housing, a disc-shaped housing, or a box-shaped housing. Optionally, the housing includes a lower housing for receiving the battery module 20 and an upper housing for closing the lower housing. After closing the lower housing, the upper housing together with the lower housing forms an accommodating portion for accommodating the battery module 20. In other optional embodiments, the battery pack 10 includes a housing and a plurality of secondary batteries 30 directly arranged in the housing.

Figure 3:
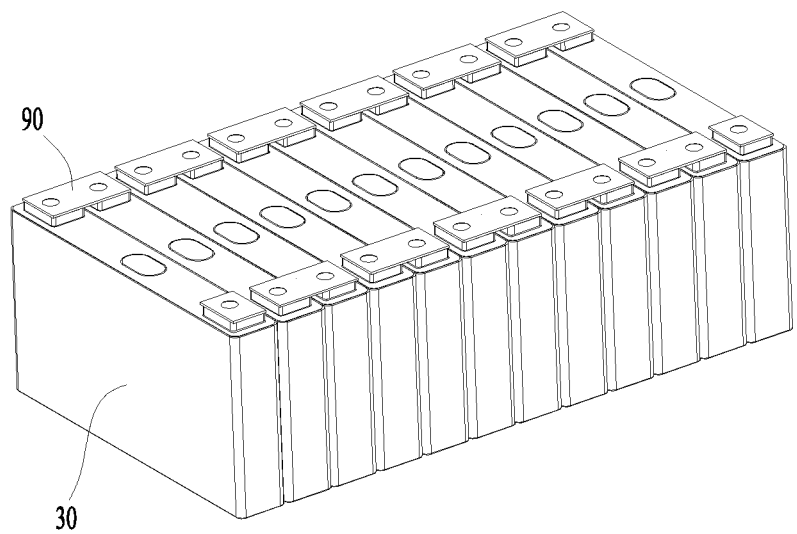
FIG. 3 is a partial structural schematic diagram of a battery module disclosed in an embodiment of the present application.

As shown in FIG. 3, the battery block may also be formed as a battery module 20, and a plurality of battery modules 20 are arranged in a housing and installed on the vehicle body.

As shown in FIG. 3, the battery module 20 includes a plurality of secondary batteries 30. The battery module 20 may be provided in various manners. In one embodiment, the battery module 20 includes an accommodating portion and a plurality of secondary batteries 30 located in the accommodating portion. The plurality of secondary batteries 30 are arranged side by side in the accommodating portion. The accommodating portion may be provided in various manners, and for example, the accommodating portion includes a shell and a cover plate covering the shell; or, the accommodating portion includes side plates and end plates that are connected one after another and define an enclosure; or, the accommodating portion includes two ends plates arranged oppositely and a strap band surrounding the end plates and the secondary batteries 30.

Figure 4:
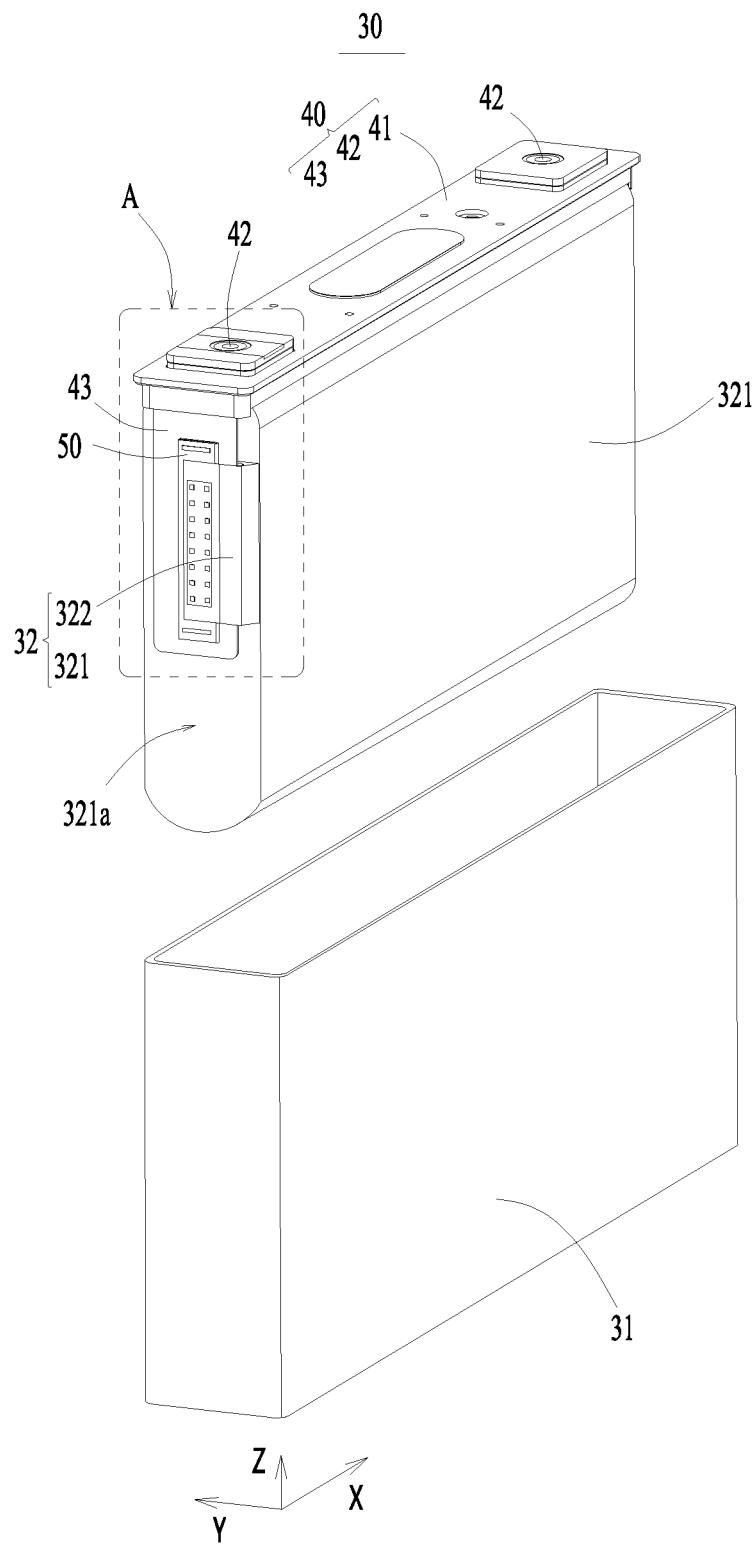
FIG. 4 is an explosive schematic diagram of a structure of a secondary battery disclosed in an embodiment of the present application.

As shown in FIG. 4, the secondary battery 30 according to the embodiment of the present application includes a casing 31, an electrode assembly 32 disposed in the casing 31, and a cap assembly 40 hermetically connected with the casing 31.

The casing 31 according to the embodiment of the present application is formed in a cubic shape or other shapes. The casing 31 includes an internal space for accommodating the electrode assembly 32 and electrolyte, and an opening communicating with the internal space. The casing 31 may be made of materials such as aluminum, aluminum alloy, plastic or other else.

The electrode assembly 32 according to the embodiment of the present application can be formed by stacking or winding a first electrode plate, a second electrode plate, and a separator located between the first electrode plate and the second electrode plate, wherein the separator is an insulating member between the first electrode plate and the second electrode plate.

In the present embodiment, the description is made by exemplarily taking the first electrode plate as a positive electrode plate and taking the second electrode plate as a negative electrode plate. Both the positive electrode plate and the negative electrode plate include coated regions and uncoated regions, a positive electrode plate active material is coated on the coated region of the positive electrode plate, and a negative electrode plate active material is coated on the coated region of the negative electrode plate. On the coated region, the active material is coated on a region corresponding to a current collector formed by a thin metal foil. On the uncoated region, the current collector is directly exposed and no active material is coated. After being wound or stacked, the electrode assembly 32 includes two tabs 322, namely, a positive tab and a negative tab. The coated regions of the positive electrode plate and the coated regions of the negative electrode plate constitute the main body portion 321. The uncoated regions of the positive electrode plate are stacked to form the positive tab, and the uncoated regions of the negative electrode plate are stacked to form the negative tab. The tab 322 includes a plurality of layer structures. In the embodiment of the present application, the main body portion 321 includes two end surfaces 321a disposed opposite to each other in a length direction X, and the positive and negative tabs respectively extend out from the two end surfaces 321a of the main body portion 321 opposite to each other in the length direction X.

In the embodiment in which the electrode assembly 32 is in a wound configuration, the electrode assembly 32 as a whole are formed as a flat member. The electrode assembly 32 includes a wide surface and a narrow surface alternately arranged in a circumferential direction, wherein the wide surface is approximately parallel to a winding axis and is an outer surface which has the largest area. The wide surface may be a relatively flat surface, while not required to be a perfect flat plane. During use of the secondary battery 30, the electrode assembly 32 may expand, which may cause the wide surface to be slightly deformed. In the present embodiment, the length direction X of the electrode assembly 32 is parallel to the winding axis and approximately parallel to the wide surface, and a thickness direction Y refers to a direction perpendicular to the wide surface. The length direction X and the thickness direction Y are perpendicular to a width direction Z, respectively.

In the embodiment where the electrode assembly 32 is in a stacked configuration, the length direction X of the electrode assembly 32 refers to a direction perpendicular to the end surface 321a of the main body portion 321 from which the tab 322 extends out, and the thickness direction Y refers to a stacking direction of the first electrode plate, the separator, and the second electrode plate. The length direction X and the thickness direction Y are perpendicular to the width direction Z, respectively.

Figure 5:
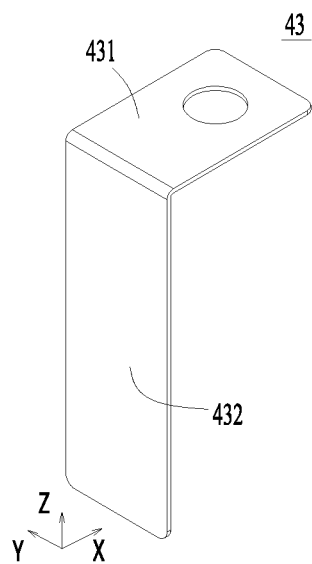
FIG. 5 is a schematic structural diagram of a current collecting member according to an embodiment of the present application.

Referring to FIG. 4 and FIG. 5, the cap assembly 40 according to the embodiment of the present application includes a cap plate 41, an electrode terminal 42 and a current collecting member 43. The cap plate 41 according to the embodiment of the present application includes an outer surface and an inner surface opposite each other in the width direction Z of the electrode assembly 32 and an electrode lead-out hole (not shown in the drawings) penetrating through the cap plate 41 in the width direction Z. The cap plate 41 can close the opening of the casing 31 and is hermetically connected to the casing 31. The electrode terminal 42 is provided on the cap plate 41 and disposed corresponding to the electrode lead-out hole. The electrode terminal 42 is at least partially exposed from the outer surface of the cap plate 41 for welding with a busbar 90. The current collecting member 43 is adapted to connect the tab 322 with the electrode terminal 42. The current collecting member 43 includes a terminal connecting section 431 and a guiding section 432. The terminal connecting section 431 is adapted to connect with the electrode terminal 42, and the guiding section 432 is adapted to connect with the tab 322. The plane where the terminal connecting section 431 is located, is perpendicular to the width direction Z of the electrode assembly 32 and is approximately parallel to the plane wherein the cap plate 41 is located. The plane where the guiding section 432 is located, is perpendicular to the length direction X of the electrode assembly 32 and is approximately parallel to the end surface 321a of the main body portion 321. In one example, the terminal connecting section 431 and the guiding section 432 are intersected, forming an L-shaped member.

After realizing the problem of a poor current flowing capability of the connection region between the tab 322 and the current collecting member 43, Applicant conducted research and analysis on various components of the secondary battery 30. Applicant found that in the process of connecting the tab 322 with the current collecting member 43, in order to ensure the connection strength between the tab 322 and the current collecting member 43, the multiple layer structures of the tab 322 are usually pre-connected, and then the tab 322 after the pre-connection is operated again to connect with the current collecting member 43, which causes the tab 322 to undergo two connecting operations at a same region, and the connection regions of the two connecting operations overlap or at partially overlap in their projections on a plane perpendicular to the length direction X, thereby causing damage to the tab 322 in these regions, and thus affecting the current flowing capability of the tab 322.

In view of the above-mentioned problem found by Applicant, Applicant has improved the configuration of the secondary battery 30, and the embodiments of the present application will be further described below.

Figure 6:
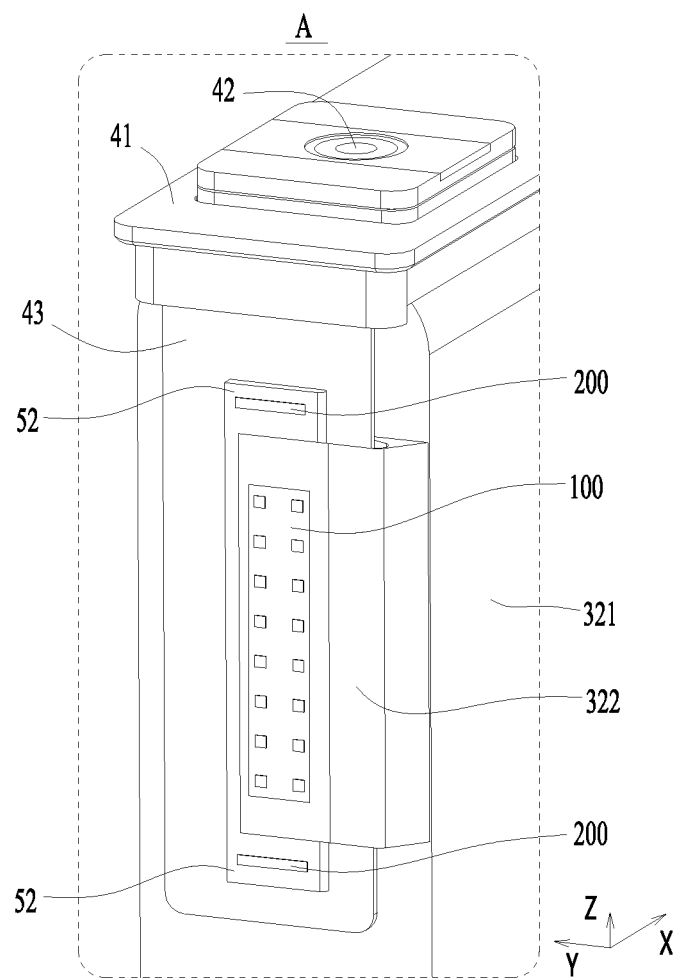
FIG. 6 is an enlarged view of portion A in FIG. 4.
Figure 7:
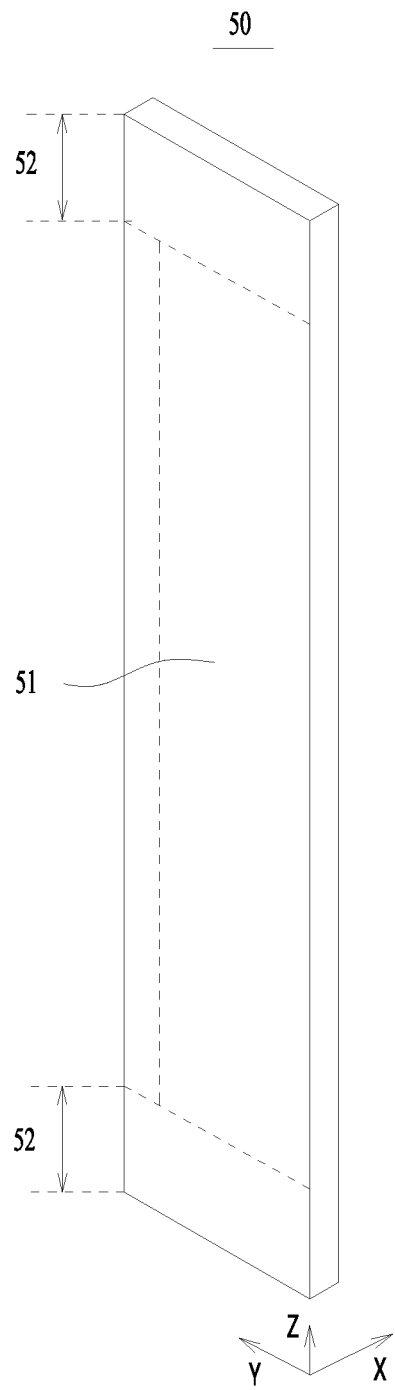
FIG. 7 is a schematic structural diagram of a transition connecting piece disclosed in an embodiment of the present application.

Referring to FIGS. 4 and 6, the secondary battery 30 provided by the embodiment of the present application further includes a transition connecting piece 50. The transition connecting piece 50 and the current collecting member 43 are separately provided and connected to each other. The so-called "separately provided" means that the transition connecting piece 50 and the current collecting member 43 are two separately processed parts before being connected. The specific ways of connecting the transition connecting piece 50 with the current collecting member 43 include riveting, welding, and bonding. The transition connecting piece 50 is adapted to connecting the tab 322 with the guiding section 432 of the current collecting member 43. As shown in FIG. 7, the transition connecting piece 50 includes a current collecting portion 51 and a fixing portion 52. The current collecting portion 51 is adapted to connect with the tab 322 and form a first connection region 100, and the fixing portion 52 is adapted to connect with the guiding section 432 and form a second connection region 200. Projections of the first connection region 100 and the second connection region 200 on a plane perpendicular to the length direction X do not overlap.

As shown in FIG. 6, the first connection region 100 and the second connection region 200 are spaced apart in the width direction Z, so that their respective projections on a plane perpendicular to the length direction X do not overlap. In some other examples, the first connection region 100 and the second connection region 200 may be spaced apart in the thickness direction Y, so that their respective projections on a plane perpendicular to the length direction X do not overlap.

Referring to FIG. 5 and FIG. 6, in the secondary battery 30 according to the embodiment of the present application, the tab 322 of the electrode assembly and the current collecting portion 51 of the transition connecting piece 50 are connected to form the first connection region 100, so that the multiple layer structures of the tab 322 and the current collecting portion 51 are pre-connected together to prevent looseness among the layer structures. In other words, by pre-connecting the various layer structures of the tab 322 together, the gap between the various layer structures can be reduced. Meanwhile, in the process of connecting the various layer structures of the tab 322, the transition connecting piece 50 can also protect the tab 322, thereby preventing the tab 322 from being damaged. The fixing portion 52 of the transition connecting piece 50 and the guiding section 432 of the current collecting member 43 are connected to form the second connection region 200, so that the tab 322 is electrically connected to the guiding section 432 through the transition connecting piece 50, without directly connecting the tab 322 to the guiding section 432. The electrical signal can be transmitted from the tab 322 to the current collecting portion 51, from the current collecting portion 51 to the fixing portion 52, and then from the fixing portion 52 to the guiding section 432 in order. Since after providing the transition connecting piece 50, the first connection region 100 and the second connection region 200 can be independent of each other without interfering with each other, when achieving the connection of the tab 322 with the guiding section 432, the first connection region 100 and the second connection region 200 do not overlap, and the tab 322 undergoes only one connecting operation when connected to the current collecting portion 51. As such, during the process of connecting the tab 322 with the current collecting member 43, the tab 322 will not undergo two connecting operations at a same region, which effectively reduces the possibility that micro cracks appear in at least some of the layer structures of the tab 322 and affect the current flowing capability of the tab 322 due to that the tab 322 undergoes two connecting operations at a same region. Further, in the prior art, the current collecting member 43 includes a bending section integrally formed with the guiding section 432. The bending section needs to be bent after connected to the tab 322. In the process of bending the bending section, the guiding section 432 will be stressed and deformed toward the main body portion 321 of the electrode assembly 32, and thus there is a risk that the guiding section 432 interferes with the main body portion 321 and causes the main body portion 321 to be damaged or short-circuited. In the embodiment of the present application, since the tab 322 is pre-connected with the transition connecting piece 50, and then the transition connecting piece 50 is connected with the guiding section 432, and the transition connecting piece 50 is formed separately from the current collecting member 43 and does not need to be bent, the guiding section 432 will not be deformed toward the main body portion 321 of the electrode assembly 32, thereby reducing the possibility of interference between the guiding section 432 and the main body portion 321.

In one embodiment, the tab 322 is welded to the current collecting portion 51 to form the first connection region 100. Optionally, the tab 322 and the current collecting portion 51 are welded by ultrasonic welding, which is beneficial to improve the reliability of the connection between the tab 322 and the current collecting portion 51, and meanwhile can reduce the possibility of structural damage to the tab 322 when the tab 322 is welded. The fixing portion 52 is welded to the guiding section 432 to form the second connection region 200. Optionally, the fixing portion 52 and the guiding section 432 are welded by laser welding, which is beneficial for improving the reliability of the connection between the fixing portion 52 and the guiding section 432. During the connection process of the tab 322, the transition connecting piece 50 and the guiding section 432, the tab 322 and the current collecting portion 51 are both placed between an upper clamp and a lower clamp on an ultrasonic welding device to complete the welding operation, and then the transition connecting piece 50 and the guiding section 432 are placed in a laser welding device to complete the welding operation. If the tab 322 is directly welded to the guiding section 432, the tab 322 will undergo a ultrasonic welding at first, then a laser welding at a same region, and in this case, the tab 322 that has experienced the ultrasonic welding operation will then be subjected to the laser welding operation, and thus structural damage such as micro cracks tends to appear in the tab 322. In the present embodiment, since the regions of ultrasonic welding and laser welding do not overlap, the tab 322 is prevented from undergoing two connecting operations of ultrasonic welding and laser welding at a same region, the possibility that the structural damage such as micro cracks appears in the tab 322 is reduced, and thus it is ensured that the tab 322 has a good current flowing capacity.

In one embodiment, referring to FIG. 6 and FIG. 7, the region of the transition connecting piece 50 covered by the tab 322 forms the current collecting portion 51. Here, the region of the transition connecting piece 50 covered by the tab 322 refers to the portion of the transition connecting piece 50 blocked by the tab 322 while observed along the length direction X. The region of the transition connecting piece 50 which is not covered by the tab 322 forms the fixing portion 52. Here, the region of the transition connecting piece 50 which is not covered by the tab 322 refers to the portion of the transition connecting piece 50 which is not blocked by the tab 322 while observed along the length direction X.

In one embodiment, the fixing portion 52 is located on one side of the tab 322 in the width direction Z, so that the size of the transition connecting piece 50 in the thickness direction Y can be reduced, that is, the width of the transition connecting piece 50 can be reduced. At least part of the current collecting portion 51 is connected to the tab 322 to form the first connection region 100. In one example, the first connection region 100 is a continuous region, which is beneficial for improving the connection strength between the current collecting portion 51 and the tab 322. At least part of the fixing portion 52 is connected to the guiding section 432 to form the second connection region 200. Referring to FIG.

6, the transition connecting piece 50 includes two fixing portions 52. The two fixing portions 52 are respectively located on two sides of the current collecting portion 51 in the width direction Z, that is, in the width direction Z, one fixing portion 52 is located on one side of the tab 322, and the other fixing portion 52 is located on another side of the tab 322. The two fixing portions 52 are respectively welded to the guiding section 432 to form two second connection regions 200, which is beneficial for improving the connection strength between the transition connecting piece 50 and the guiding section 432, and reduce the possibility of detachment of the transition connecting piece 50 from the guiding section 432, and meanwhile is also beneficial for improving the current flowing capacity between the transition connecting piece 50 and the guiding section 432.

In one embodiment, referring to FIG. 6, the transition connecting piece 50 is provided on a side of the guiding section 432 away from the main body portion 321 in the length direction X, so that the welding operation between the fixing portion 52 and the guiding section 432 can be performed from a side of the guiding section 432 away from the main body portion 321, which is beneficial for improving the convenience of welding operation for connecting the fixing portion 52 with the guiding section 432, and meanwhile, the transition connecting piece 50 will not occupy the space between the guiding section 432 and the main body portion 321, a relatively large distance is maintained between the guiding section 432 and the main body portion 321, which further reduces the possibility of structural damage to the main body portion 321 due to an external force. In the present embodiment, at least part of the fixing portion 52 is attached to a surface of the guiding section 432. In one example, as shown in FIG. 6, an entire surface of the fixing portion 52 facing the guiding section 432 is attached to the guiding section 432. In the present embodiment, the tab 322 is bent relative to the length direction X and connected to a surface of the current collecting portion 51 away from the guiding section 432 in the length direction X.

Figure 8:
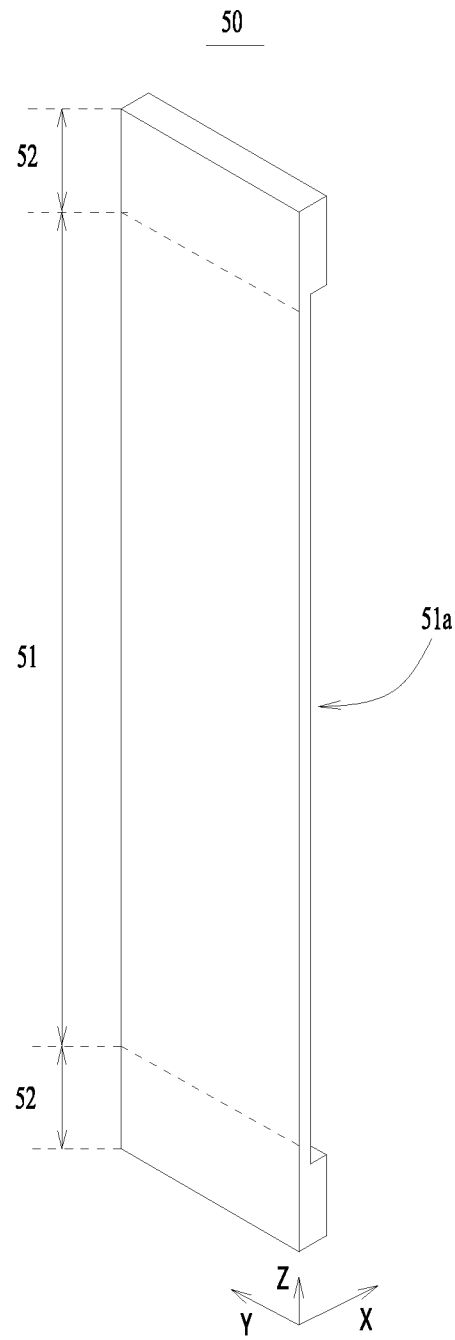
FIG. 8 is a schematic structural diagram of a transition connecting piece disclosed in another embodiment of the present application.

In another embodiment, the tab 322 is bent relative to the length direction X and is connected to a surface of the current collecting portion 51 close to the guiding section 432. The transition connecting piece 50 and the guiding section 432 clamp the tab 322 and thus can protect the tab 322 and the first connection region 100. In one example, as shown in FIG. 8, the current collecting portion 51 includes an accommodating recess 51a. The accommodating recess 51a is formed by recessing a surface of the current collecting portion 51 close to the guiding section 432 toward a direction away from the guiding section 432. The tab 322 extends into the accommodating recess 51a and is connected and fixed to the current collecting portion 51. In the length direction X, at least part of the tab 322 is accommodated in the accommodating recess 51a. Optionally, in the length direction X, a depth of the accommodating recess 51a is greater than a thickness of the entire tab 322, so that the entire tab 322 is accommodated in the accommodating recess 51a. As such, on one hand, it is beneficial for saving space in the length direction X, thereby increasing the energy density of the secondary battery 30; on the other hand, due to the accommodating recess 51a, the current collecting portion 51 itself receives a smaller supporting stress from the tab 322 or even does not receive any supporting stress from the tab 322 after the transition collecting piece 50 is connected to the guiding section 432, and thus, the second connection region 200 formed by the connection between the fixing portion 52 and the guiding section 432 receives a smaller supporting stress or even does not receive any supporting stress from the tab 322, thereby reducing the possibility of fracture and separation of the second connection region 200 formed by the connection between the fixing portion 52 and the guiding section 432 due to a relatively large tensile stress.

In one embodiment, referring to FIG. 7 and FIG. 8, the transition connecting piece 50 is an integrally formed single-layer sheet. The transition connecting piece 50 can be manufactured by stamping or machining. The thickness direction of the transition connecting piece 50 and the thickness direction of the guiding section 432 are both parallel to the length direction X. In the present embodiment, the transition connecting piece 50 is formed in a rectangular shape, but the shape of the transition connecting piece 50 is not limited here, as long as the transition connecting piece 50 can realize the function of connecting the tab 322 with the guiding section 432.

Figure 9:
FIG. 9 is a schematic structural diagram of a transition connecting piece disclosed in a further embodiment of the present application.
Figure 10:
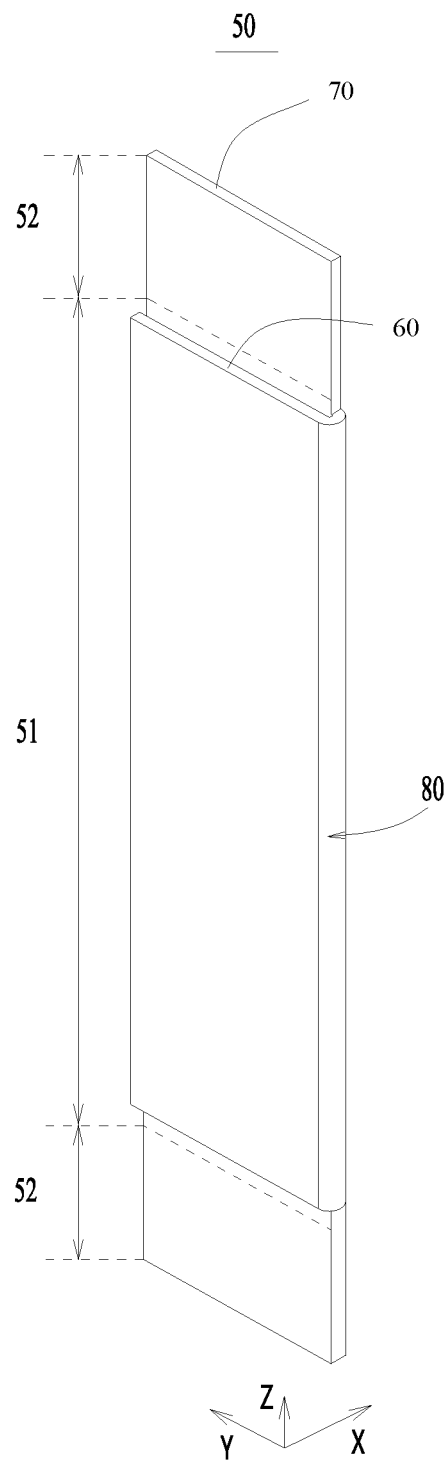
FIG. 10 is a schematic structural diagram of a transition connecting piece disclosed in another further embodiment of the present application.

In one embodiment, referring to FIG. 9, the transition connecting piece 50 includes a first sheet 60, a second sheet 70 and a third sheet 80. The first sheet 60 and the second sheet 70 are stacked in the length direction X. The third sheet 80 is bent into an arc shape and connected between the first sheet 60 and the second sheet 70. The tab 322 is connected with the first sheet 60 to form the first connection region 100. Before the transition connecting piece 50 and the tab 322 are connected, the first sheet 60 and the second sheet 70 are provided in an open state, and it is available to connect and fix the tab 322 with the first sheet 60 at first, then bend the second sheet 70 and stack it with the first sheet 60. It facilitates welding the first sheet 60 of the transition connecting piece 50 to the tab 322, thus reducing the difficulty of connecting the transition connecting piece 50 with the tab 322. When connecting the transition connecting piece 50 to the guiding section 432, the transition connecting piece 50 is connected to the guiding section 432 through both of the first sheet 60 and the second sheet 70 to form the second connection region 200, thereby being beneficial for improving the connection strength between the fixing portion 52 of the transition connecting piece 50 and the guiding section 432. In another embodiment, referring to FIG. 10, the second sheet 70 extends beyond the first sheet 60 in the width direction Z of the electrode assembly 32. The second sheet 70 is provided with the fixing portion 52. In the present embodiment, the portion of the second sheet 70 that extends beyond the first sheet 60 forms the fixing portion 52.

In one embodiment, along the thickness direction Y, the guiding section 432 has two opposite edges. The tab 322 bypasses the edge of the guiding section 432 and is connected to a surface of the current collecting portion 51 away from the main body portion 321. An outer surface of the third sheet 80 is formed as an arc-shaped surface. The third sheet 80 is located near a root portion of the tab 322, and thus can effectively reduce the scratching between the tab 322 and the edges of the first sheet 60 and/or the second sheet 70 of the transition connecting piece 50 when the tab 322 is folded, which may cause the tab 322 pierced by the edges of the first sheet 60 and/or the second sheet 70, or cause a stress concentration on the tab 322 due to the squeeze of the first sheet 60 and/or the second sheet 70, which thus cause structural damage such as cracks in the tab 322.

Figure 11:
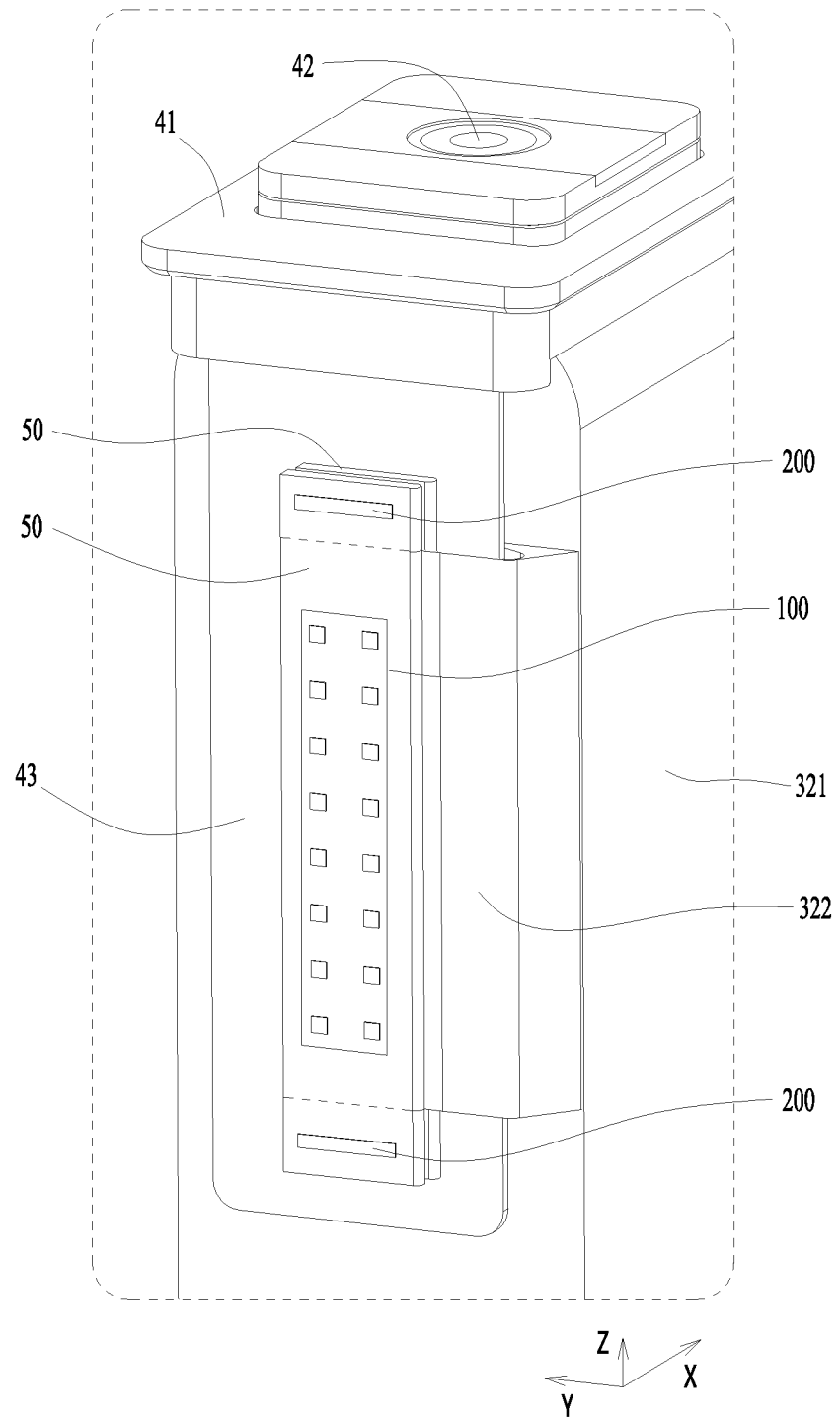
FIG. 11 is a partial schematic diagram of a structure of a secondary battery disclosed in another embodiment of the present application.

In one embodiment, as shown in FIG. 11, two transition connecting pieces 50 are provided. In the length direction X, the two transition connecting pieces 50 are stacked. The current collecting portions 51 of the two transition connecting pieces 50 clamp and connect to the tab 322. At least one of the two transition connecting pieces 50 is connected with the tab 322 to form the first connection region 100. Optionally, the two transition connecting pieces 50 are both connected with the tab 322 to form the first connection region 100. The fixing portion 52 of at least one of the two transition connecting pieces 50 is connected to the guiding section 432. Optionally, the fixing portions 52 of the two transition connecting pieces 50 are both connected to the guiding section 432.

Figure 12:
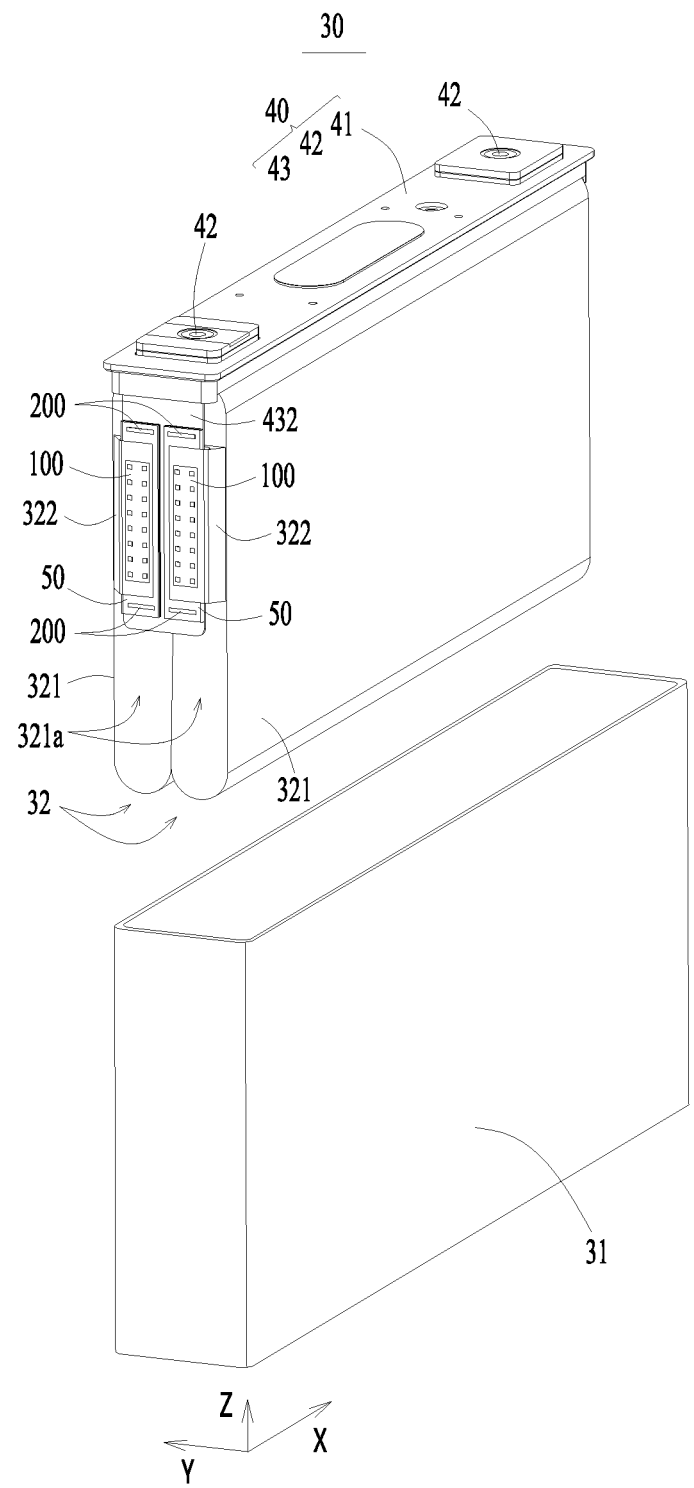
FIG. 12 is an explosive schematic diagram of a structure of a secondary battery disclosed in a further embodiment of the present application.
Figure 13:
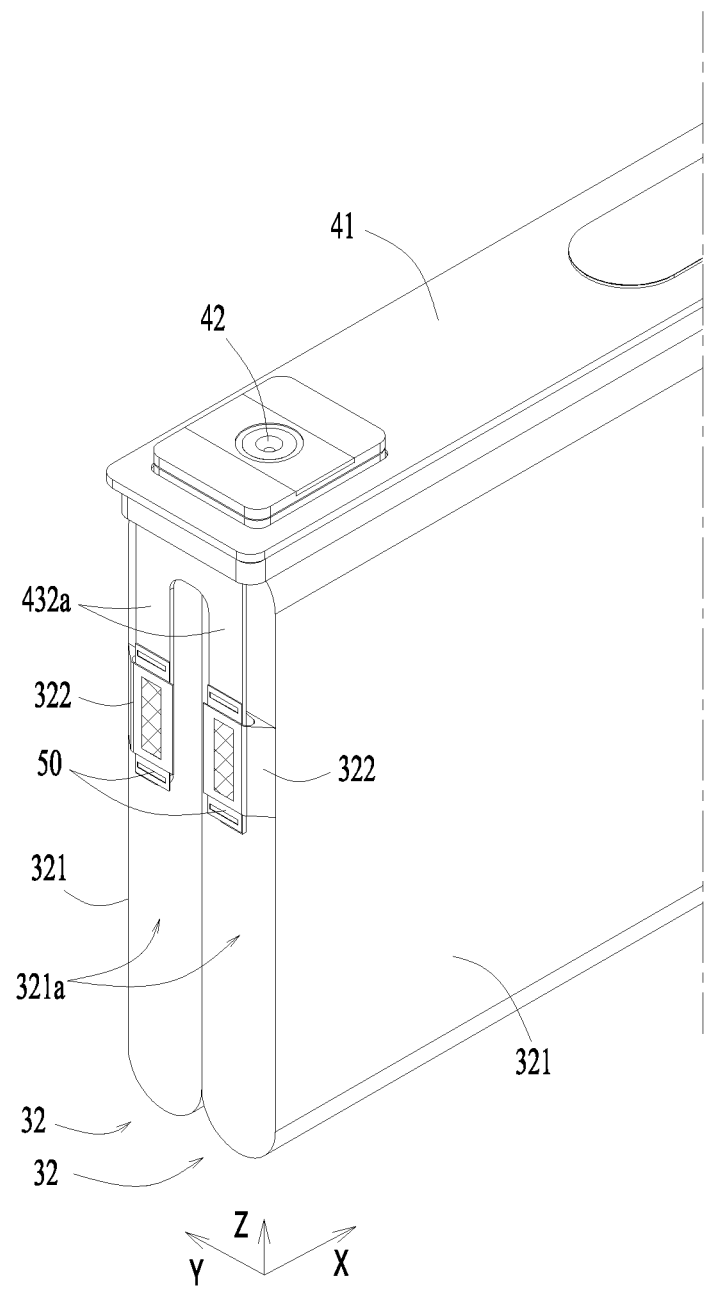
FIG. 13 is a partial schematic diagram of a structure of a secondary battery disclosed in another further embodiment of the present application.

In one embodiment, two electrode assemblies 32 are provided. The two electrode assemblies 32 are arranged side by side in the thickness direction Y of the electrode assembly 32, and the respective tabs 322 are respectively connected to at least one transition connecting piece 50. As shown in FIG. 12, two transition connecting pieces 50 are provided on one guiding section 432. The two transition connecting pieces 50 are arranged side by side in the thickness direction Y. The tab 322 of one of the two electrode assemblies 32 is connected to the current collecting portion 51 of one transition connecting piece 50, and the tab 322 of the other electrode assembly 32 is connected to the current collecting portion 51 of the other transition connecting piece 50.

In one embodiment, the guiding section 432 includes two legs 432a. The two legs 432a are spaced apart in the thickness direction Y of the electrode assembly 32, which is beneficial for reducing the weight of the guiding section 432 and improving the energy density of the secondary battery 30. At least one transition connecting piece 50 is provided on each of the two legs 432a. The electrode assemblies 32 and the legs 432a are set in one-to-one correspondence and have the same quantity. Referring to the embodiment shown in FIG. 13, the guiding section 432 includes two legs 432a. Each of the two legs 432a is provided with one transition connecting piece 50. The tab 322 of one of the two electrode assemblies 32 is connected to the current collecting portion 51 of one transition connecting piece 50, and the tab 322 of the other electrode assembly 32 is connected to the current collecting portion 51 of the other transition connecting piece 50.

In the secondary battery 30 according to the embodiment of the present application, the tab 322 of the electrode assembly 32 is connected to the guiding section 432 of the current collecting member 43 through a transition connecting piece 50. The tab 322 of the electrode assembly 32 and the current collecting portion 51 of the transition connecting piece 50 are connected and form the first connection region 100. The fixing portion 52 of the transition connecting piece 50 and the guiding section 432 of the current collecting member 43 are connected and form the second connection region 200. By providing the transition connecting piece 50, the first connection region 100 and the second connection region 200 can be made respectively independent without interfering with each other; therefore, when achieving the connection of the tab 322 with the guiding section 432, the first connection region 100 and the second connection region 200 do not overlap, and thus the tab 322 undergoes only one connecting operation when connected to the current collecting portion 51. As such, during the connection process between the tab 322 and the current collecting member 43, the tab 322 will not undergo two connecting operations at a same region, which effectively reduces the possibility that at least some of the layer structures of the tab 322 may experience micro cracks on them due to that the tab 322 undergoes two connecting operations at a same region, which may further decrease the current flowing capability of the tab 322.

The embodiment of the present application further provides a manufacturing method for the secondary battery 30, the method includes steps of:

providing an electrode assembly 32, the electrode assembly 32 including a main body portion 321 and a tab 322 extending out from the main body portion 321;

providing a current collecting member 43, the current collecting member 43 including a guiding section 432, and the guiding section 432 extending in a direction perpendicular to a length direction X of the electrode assembly 32;

providing a transition connecting piece 50, the transition connecting piece 50 including a current collecting portion 51 and a fixing portion 52; and connecting the current collecting portion 51 with the tab 322 to form a first connection region 100, and connecting the fixing portion 52 with the guiding section 432 to form a second connection region 200, wherein respective projections of the first connection region 100 and the second connection region 200 on a plane perpendicular to the length direction X do not overlap.

In one embodiment, the current collecting portion 51 is welded to the tab 322 to form the first connection region 100. Optionally, the tab 322 and the current collecting portion 51 are welded by ultrasonic welding. The fixing portion 52 is welded to the guiding section 432 to form the second connection region 200. Optionally, the fixing portion 52 and the guiding section 432 are welded by laser welding.

In one embodiment, first the current collecting portion 51 and the tab 322 are welded to form the first connection region 100, and then the fixing portion 52 and the guiding section 432 are welded to form the second connection region 200. During the connecting process of the tab 322, the transition connecting piece 50 and the guiding section 432, the tab 322 and the current collecting portion 51 are placed between an upper clamp and a lower clamp on an ultrasonic welding equipment at the same time, completing the welding operation between the tab 322 and the current collecting portion 51, and then the transition connecting piece 50 and the guiding section 432 are placed at a laser welding equipment, completing the welding operation of the fixed portion 52 and the guiding section 432. If the tab 322 is directly welded to the guiding section 432, a same region of the tab 322 will undergo a ultrasonic welding first and then a laser welding in sequence, in which case structural damage such as micro cracks tends to appear on the tab 322 after the tab 322 undergoes the laser welding. In the present embodiment, since the regions of ultrasonic welding and laser welding do not overlap, the tab 322 is prevented from undergoing two connecting operations of ultrasonic welding and laser welding at a same region, thus reducing the possibility of structural damage such as micro cracks of the tab 322 and ensuring a good current flowing capacity of the tab 322.

In the manufacturing method for the secondary battery 30 according to the embodiment of the present application, through connecting the current collecting portion 51 of the transition connecting piece 50 to the tab 322 of the electrode assembly 32 in advance, and then connecting the fixing portion 52 of the transition connecting piece 50 to the guiding section 432 of the current collecting member 43, the connections of the tab 322, the transition connecting piece 50 and the guiding section 432 are realized. Since the two connection positions are respectively located at the current collecting portion 51 and the fixing portion 52, the tab 322 undergoes only one connecting operation during connection to the current collecting portion 51, thus preventing a same region of the tab 322 from experiencing two connecting operations during direct connection of the tab 322 with the guiding section 432, reducing a possibility of structural damage such as micro-crack of a same region of the tab 322 due to experiencing two times of connecting process, and ensuring a good current flowing capability of the tab 322.

Although the present application has been described with reference to the preferred embodiments, various improvements can be made to the present application and the components therein can be replaced with equivalents, without departing from the scope of the present application. In particular, as long as there is no structural conflict, the various technical features mentioned in the various embodiments can be combined in any manner. The present application is not limited to the specific embodiments disclosed in the context, but includes all technical solutions falling within the scope of the claims.

What is claimed is:

1. A secondary battery, comprising:
    an electrode assembly comprising a main body portion and a tab extending out from the main body portion;
    a current collecting member comprising a guiding section, the guiding section extending in a direction perpendicular to a length direction of the electrode assembly;
    a transition connecting piece, the transition connecting piece and the current collecting member being separately provided, the transition connecting piece comprising a current collecting portion and a fixing portion, the current collecting portion being adapted to connect with the tab and to form a first connection region, the fixing portion being adapted to connect with the guiding section and to form a second connection region, and respective projections of the first connection region and the second connection region on a plane perpendicular to the length direction do not overlap in a state that the electrode assembly, the current collecting member and the transition connecting piece are loaded into a shell of the secondary battery.

2. The secondary battery according to claim 1, wherein the tab is welded to the current collecting portion to form the first connection region, and the fixing portion is welded to the guiding section to form the second connection region.

3. The secondary battery according to claim 1, wherein a region of the transition connecting piece covered by the tab forms the current collecting portion, and a region of the transition connecting piece not covered by the tab forms the fixing portion.

4. The secondary battery according to claim 3, wherein the fixing portion is located on one side of the tab in a width direction of the electrode assembly.

5. The secondary battery according to claim 1, wherein the transition connecting piece comprises two fixing portions, and the two fixing portions are respectively located on two sides of the current collecting portion in a width direction of the electrode assembly, and are respectively welded to the guiding section to form two second connection regions.

6. The secondary battery according to claim 1, wherein the transition connecting piece is disposed on a side of the guiding section away from the main body portion.

7. The secondary battery according to claim 1, wherein the tab is bent relative to the length direction and connected to a surface of the current collecting portion away from the guiding section.

8. The secondary battery according to claim 1, wherein the tab is bent relative to the length direction and connected to a surface of the current collecting portion close to the guiding section.

9. The secondary battery according to claim 8, wherein the current collecting portion comprises an accommodating recess, the accommodating recess is recessed in a direction away from the guiding section, and the tab extends into the accommodating recess and is connected and fixed with the current collecting portion.

10. The secondary battery according to claim 1, wherein the transition connecting piece is an integrally formed single-layer sheet.

11. The secondary battery according to claim 1, wherein the transition connecting piece comprises a first sheet, a second sheet and a third sheet, the first sheet and the second sheet are stacked in the length direction, and the third sheet is bent into an arc shape and connected between the first sheet and the second sheet.

12. The secondary battery according to claim 11, wherein the second sheet extends beyond the first sheet in a width direction of the electrode assembly, and a portion of the second sheet extending beyond the first sheet is connected to the guiding section.

13. The secondary battery according to claim 1, wherein two transition connecting pieces are provided, and the current collecting portions of the two transition connecting pieces clamp and connect to the tab;
    the fixing portion of at least one of the two transition connecting pieces is connected to the guiding section.

14. The secondary battery according to claim 1, wherein two electrode assemblies are provided, the two electrode assemblies are arranged side by side in a thickness direction of the electrode assembly, and respective tabs of the two electrode assemblies are respectively connected to at least one of the transition connecting pieces.

15. The secondary battery according to claim 1, wherein the guiding section comprises two legs, the two legs are spaced apart in a thickness direction of the electrode assembly, and each of the two legs is provided with at least one transition connecting piece.

16. A battery module, comprising the secondary battery according to claim 1.

17. An apparatus using a secondary battery as a power source, wherein the apparatus comprises the secondary battery according to claim 1.

18. A manufacturing method for a secondary battery, the method comprises steps of:
    providing an electrode assembly, the electrode assembly comprising a main body portion and a tab extending out from the main body portion;
    providing a current collecting member, the current collecting member comprising a guiding section extending in a direction perpendicular to a length direction of the electrode assembly;
    providing a transition connecting piece, the transition connecting piece comprising a current collecting portion and a fixing portion; and
    connecting the current collecting portion with the tab to form a first connection region and connecting the fixing portion with the guiding section to form a second connection region, wherein respective projections of the first connection region and the second connection region on a plane perpendicular to the length direction do not overlap in a state that the electrode assembly, the current collecting member and the transition connecting piece are loaded into a shell of the secondary battery.

19. The manufacturing method according to claim 18, wherein the current collecting portion is welded to the tab and to form the first connection region, and the fixing portion is welded to the guiding section and to form the second connection region.

20. The manufacturing method according to claim 19, wherein the current collecting portion is welded to the tab first, forming the first connection region, and then the fixing portion is welded to the guiding section, forming the second connection region.

* * * * *